Nov. 3, 1931.  E. M. CROSLAND  1,830,426
DOUGH SHEETING AND CUTTING MACHINE
Filed Sept. 19, 1930   2 Sheets-Sheet 1
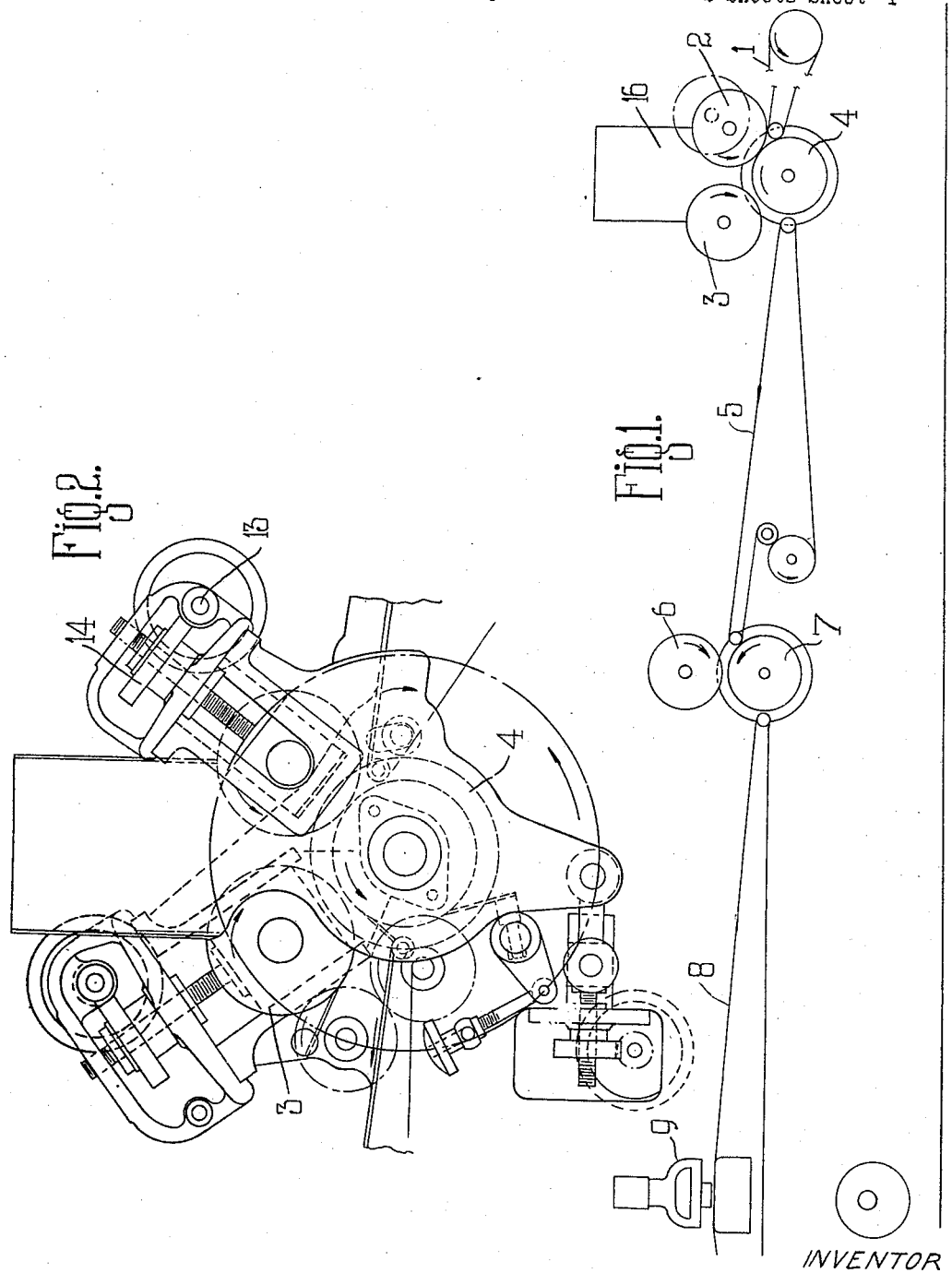
INVENTOR
Edward M. Crosland,
BY
ATTORNEYS Nov. 3, 1931.  E. M. CROSLAND  1,830,426
DOUGH SHEETING AND CUTTING MACHINE
Filed Sept. 19, 1930  2 Sheets-Sheet 2

INVENTOR
Edward M. Crosland,
BY
ATTORNEYS

Patented Nov. 3, 1931

1,830,426

UNITED STATES PATENT OFFICE

EDWARD MILNER CROSLAND, OF HELSBY, ENGLAND

DOUGH SHEETING AND CUTTING MACHINE

Application filed September 19, 1930, Serial No. 483,105, and in Great Britain December 23, 1929.

The present invention relates to the mechanical working of dough or similar plastic substances, and more particularly to cutting machines in which dough is passed between one or more pairs of gauging rollers so as to form a continuous sheet of given thickness and thence to cutters or the like for stamping out pieces of dough of any desired shape.

The dough is fed to cutting machines in sheet form. If it is desired to manufacture biscuits of the hard class, that is of the "cracker" type, it is customary to take the dough as received from a mixer and subject it to a series of rolling operations on a machine known as a brake. Batches of dough are rolled into sheets which are afterwards cut up and placed one by one in front of gauging rollers so that they will form a continuous sheet to pass under the cutters. To form a perfectly even sheet with a good surface it is desirable that there be two pairs of gauging rollers.

If however, the dough is of a soft nature and more greasy, it is often found advantageous to omit the working of the dough on the brake and to feed it directly to a machine known as a sheeting machine, which by means of rollers delivers a continuous sheet of dough to the gauging rollers of the cutting machine. This sheeting machine saves considerable labour as the dough is placed direct from a mixer into the hopper of the sheeting machine from which it issues to gauging rollers of the cutting machine without additional handling. With this softer type of dough it is usually unnecessary to have two pairs of gauging rollers. However, as the cutting machine is usually employed for treating all classes of dough, then if the machine is of the two pair roller type, the soft dough passes under both pairs.

Thus from an economic point of view, it is advisable to use the same cutting machine in conjunction with both a brake and a sheeting machine. The disadvantage of this is that the sheeting machine is usually of a fairly heavy nature and when this is placed in front of the cutting machine to feed soft doughs it causes inconvenience when working sheets of hard dough. At the same time, the sheeting machine, being in front of the cutting machine, unduly increases the total length of the machinery. To overcome this the sheeting machine is often made portable but owing to the weight of the machine its portability is somewhat limited.

Sheeting machines usually comprise three rollers so arranged in conjunction with a hopper that dough is drawn between the bight of the first two rollers and compressed into a space bounded by the periphery of the three rollers from whence it issues in the form of a sheet between the first roller and the third roller.

The objects of this invention are to overcome the disadvantages enumerated above and to simplify the machinery.

According to the present invention a gauging machine is adapted to serve also as a sheeting machine.

In one form of construction an additional or sheeting roller is provided adjacent to a pair of gauging rollers of a cutting machine so that said gauging rollers and the additional roller can operate as a sheeting machine.

Preferably, the speed of the additional roller is greater than that of the gauging rollers and the additional roller may be removably or displaceably mounted on the cutting machine so that the gauging rollers may operate alone to perform their normal function.

When serving as a sheeting machine, the rollers may be arranged with their axes in parallel disposition, the additional roller and one of the gauging rollers being above the other gauging roller. The axis of the lower gauging roller should preferably lie in a vertical plane passing intermediate of the axis of the other rollers and the peripheral surface of this roller may contact with the periphery of the sheeting roller.

The peripheries of the sheeting roller and the top gauging roller should preferably be wider apart than the peripheries of the two gauging rollers. If the two top rollers are surmounted by a hopper then the dough may be taken between the bight of the top gauging roller and the sheeting roller, and delivered into a space formed by the peripheries of the three rollers. The dough may then leave this space in the form of a sheet between the two gauging rollers.

The invention is more particularly described with reference to the accompanying drawings in which:—

Figure 1 is a diagrammatic view.

Figure 2 is an outside elevation of one form of construction.

Figure 3:
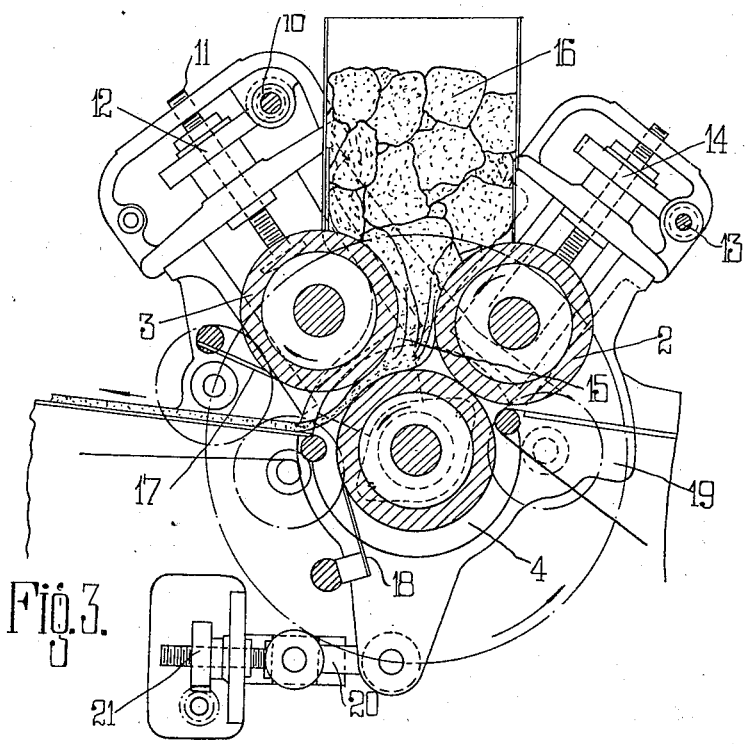
Figure 3 is a corresponding sectional side view.

Where the machine is to be used on hard dough this is fed by means of a conveyor 1 to a machine comprising three rollers 2, 3, 4, of which the rollers 3, 4, will act as a first gauging machine, for which purpose the roll 2 is displaced into the position shown in dotted lines. From this machine, the dough is conveyed by a conveyor 5 to a second gauging machine consisting of a pair of rollers 6, 7, which deliver a sheet of dough of uniform character through the conveyor 8 of the cutting machine 9. The rollers 2, 3, are each mounted to be adjustable relatively to the roller 4. The rollers 3, 4, are adjustable relatively to one another to set the thickness of the web of dough passing from the machine. This adjustment is effected by means of a hand wheel on a shaft 10 rotating a nut on the threaded spindle 11 of bearings for the roller 3 by means of the worm wheel 12.

Figure 4:
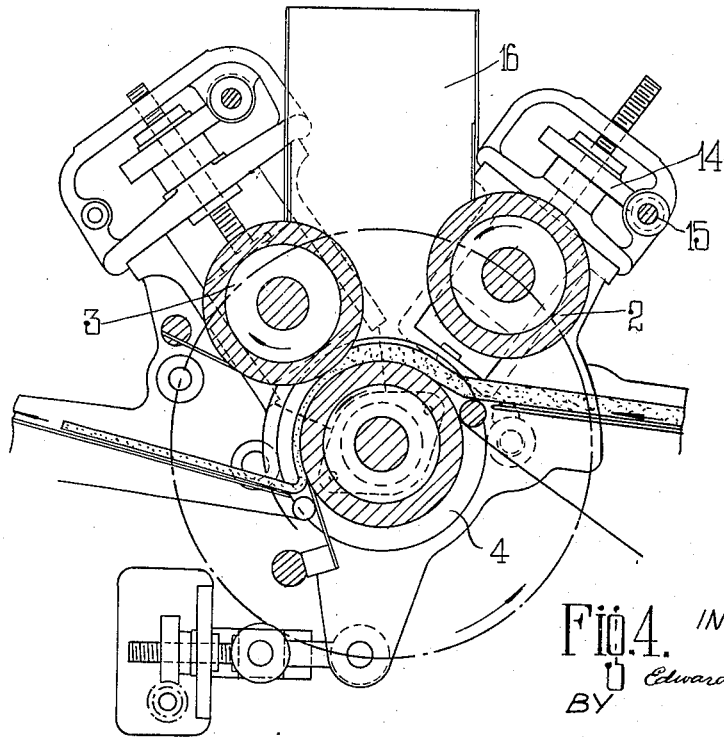
Figure 4 is a sectional view corresponding to Figure 3 with the parts in different positions.

The roller 2 can either be displaced into the position shown in Figure 4 where it lies wholly out of range of the dough, and so allows the machine to be used as a first gauging machine, or may be, by means of a worm and worm wheel gear 13, 14, brought down into contact or substantially so with the roller 4 to form one wall of a dough compression chamber 15. Where the machine is to be used as a sheeting machine, it will be noticed that the roller 2 is rotating in an opposite direction to the roller 3, so that pieces of dough placed in a detachable and removable hopper 16 will be taken up by the rollers 2, 3, and compressed to be fed out by the rollers 3, 4, in the form of a homogeneous sheet.

Roller 2 may have a greater peripheral speed than the other two rollers and may be fluted so as to give an additional compression to the dough in the chamber 15. Scrapers 17, 18, are provided on the rollers 3, 4, respectively, to maintain the surface of these clean.

To adjust the compression on the dough to adapt the machine to various characters of dough, the roller 2 may be oscillated about the centre of the roller 4, in that the bearings for the roller are carried upon yoke plates 19 to which links 20 are connected, the screw and nut 21 serving as an adjustment for swinging the yoke 19 about the centre of the roller 4.

It will consequently be seen that when working on soft dough, the material will be fed directly to the hopper 16 in which case the rollers 6, 7, act as the one and unique gauging machine, whilst in the case of hard dough fed to the conveyor 1 the hopper 16 and the roller 2 will be out of use and the rollers 3, 4, will then act as a first gauging machine and the rollers 6, 7, as a second gauging machine.

I declare that what I claim is:—

1. A moulding machine comprising in combination three driven rollers, two of said rollers being mounted with their axes above the axis of the other roller, a hopper for delivering plastic material between said two upper rollers, a feed conveyor for delivering a sheet of material between one of said upper rollers and the lower roller, a delivery conveyor for taking material from between the other upper roller and the lower roller, means for moving said first upper roller away from said lower roller whereby to allow the machine to act as a gauging machine for material coming from said conveyor, and to bring said lower roller into cooperation with the other rollers whereby to allow the machine to be used as a sheeting machine for material delivered by said hopper.

2. A moulding machine comprising three driven rollers, two of said rollers being mounted with their axes above the third roller, a hopper for delivering plastic material between the upper rollers, a feed conveyor for delivering a sheet of material between a first upper roller and said lower roller, a delivery conveyor for taking material from between said second upper roller and the lower roller, a yoke for carrying said first upper roller and pivotally mounted co-axially with said lower roller, and means to displace said yoke about the axis of said lower roller.

3. A moulding machine comprising in combination first, second and third driven rollers, a hopper for delivering plastic material between said first and second rollers, a feed conveyor for delivering a sheet of material between said second and third rollers, a delivery conveyor for taking a sheet of material from between said first and third rollers, means for moving said second roller away from said third roller whereby to allow the machine to act as a gauging machine for material coming from said conveyor and to bring said third roller into cooperation with the other rollers whereby to allow the machine to be used as a sheeting machine for material delivered by said hopper.

4. A moulding machine comprising in combination a first driven roller, a second driven roller, mounted with its axis at a higher level than the axis of said first roller and having its surface spaced from the surface of said first roller, a third driven roller mounted with its axes above the axis of said first roller, means to hold said third roller in a position in which it is substantially in contact with said first roller whereby to allow the machine to operate as a sheeting machine for material located between said second and third rollers and in a position in which it is removed therefrom to allow the machine to operate as a gauging machine, a feed conveyor for delivering a sheet of dough beneath said third roller to a position between said first and second rollers so that the latter may operate thereon, a feed hopper for delivering dough between said second and third rollers when the machine is operated as a sheeting machine so that said first and second rollers may deliver a sheet of dough, a delivery conveyor for the sheet of dough emerging from between said first and second rollers when the machine is operated either as a sheeting machine or as a gauging machine, said first and third rollers being rotated in one angular direction and said second roller in the opposite angular direction.

In witness whereof, I have hereunto signed my name this 3rd day of September, 1930.

EDWARD MILNER CROSLAND.